(12) United States Patent
Mizukami et al.

(10) Patent No.: US 6,369,315 B1
(45) Date of Patent: Apr. 9, 2002

(54) PHOTOVOLTAIC MODULE AND POWER GENERATION SYSTEM

(75) Inventors: Seishiro Mizukami; Hideo Yamagishi, both of Kyoto; Yuzuru Kondoh, Hyogo; Masataka Kondo, Kobe, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/454,679

(22) Filed: Dec. 3, 1999

(30) Foreign Application Priority Data

Mar. 30, 1999 (JP) ............................. 11-088376

(51) Int. Cl.[7] ............................................. H01L 25/00
(52) U.S. Cl. ........................................ 136/244; 136/251
(58) Field of Search .................................. 136/244, 251

(56) References Cited

U.S. PATENT DOCUMENTS

| | | | | |
|---|---|---|---|---|
| 4,542,258 A | * | 9/1985 | Francis et al. | 136/256 |
| 4,609,770 A | | 9/1986 | Nishiura et al. | 136/244 |
| 4,666,313 A | * | 5/1987 | Ganter et al. | 368/205 |

FOREIGN PATENT DOCUMENTS

| | | |
|---|---|---|
| DE | 2 942 328 | 4/1981 |
| EP | 0 535 614 | 4/1993 |
| EP | 0 855 750 | 7/1998 |
| JP | 09-326497 | 12/1997 |
| JP | 10-256578 | 9/1998 |

\* cited by examiner

*Primary Examiner*—Mark Chapman
(74) *Attorney, Agent, or Firm*—Hogan & Hartson, L.L.P.

(57) ABSTRACT

A photovoltaic module comprises a transparent substrate, a plurality of photovoltaic cells formed on the back surface of the substrate, busbars each including a busbar body connected electrically to the photovoltaic cells, an electrical insulating filler covering the photovoltaic cells and the busbar bodies, a spacer, and a cover film covering the filler. Each busbar integrally includes the busbar body and an extension long enough to project from one end of the transparent substrate. The busbar extensions, which serve as output fetching lines, are bent along the spacer, and their respective output end portions are drawn out through the cover film. The output end portions are connected individually to terminals of a terminal box.

6 Claims, 13 Drawing Sheets

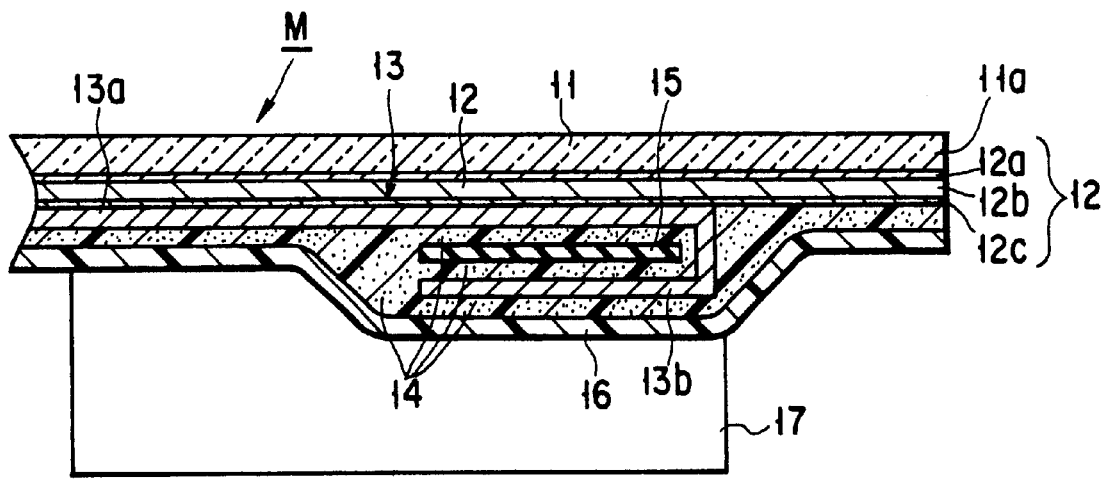
F I G. 2A
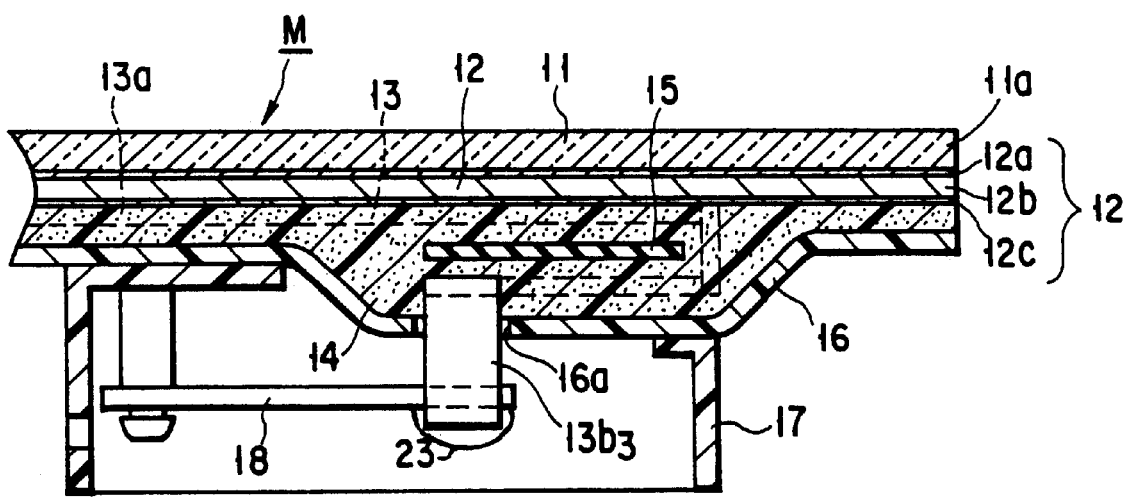
F I G. 2B

PHOTOVOLTAIC MODULE AND POWER GENERATION SYSTEM

BACKGROUND OF THE INVENTION

The present invention relates to photovoltaic modules set on, for example, a roof of a building, and more particularly, to photovoltaic modules with an improved output fetching wiring unit and a power generation system using the same.

The output of a crystalline or amorphous photovoltaic module is conducted to the outside through terminals that are set on the back surface of the module. In general, there are two types of terminals, ones for positive and negative electrodes. In some cases, these terminals are housed in a terminal box as it is called. A terminal box of one known type can contain therein both the terminals for positive and negative electrodes, while another type is designed to contain each of these terminals. A conduction path which is connected to each terminals for the module output is described in Jpn. Pat. Appln. KOKAI Publication No. 10-256578. This conduction path is an output fetching wiring unit that includes a pair of busbars, positive and negative, attached individually to the opposite ends of the photovoltaic module. In the conventional wiring unit described in the KOKAI Publication ('578), metallic foils on the back surface of the photovoltaic module and the busbars are connected electrically to one another by means of an electrically conductive material such as electrically conductive paste. Lead wires that serve as output fetching lines are soldered to the metallic foils, individually. These lead wires are drawn out of the module through a protective film (cover film) on the back surface of the photovoltaic module. The lead wires are connected individually to terminals of a terminal box or the like that is provided on the back surface of the photovoltaic module, if necessary.

In an output fetching wiring unit described in Jpn. Pat. Appln. KOKAI Publication No. 9-326497, as shown in FIGS. 23A to 23C, one end portion of each lead wire as an output fetching line is soldered to each of the positive and negative busbars 200 and 201 that are attached individually to the opposite ends of a photovoltaic module. The respective other end portions of the lead wires 202 are drawn out through a protective film (cover film) 203 on the back surface of the photovoltaic module and soldered individually to terminals of the terminal box.

Conventionally, if the wiring direction of the output fetching wiring unit is expected to be changed, first and second electrically conductive members that are independent of each other are arranged in a manner such that their respective end portions continuously extend at a given angle to each other, and their overlaps are soldered.

In the conventional output fetching wiring unit constructed in this manner, there is a lot of soldering spots that connect the busbars of the photovoltaic module and the terminal box, and there are also soldering spots in a region where the wiring direction changes. Soldering, which is poor in working efficiency, may cause electrical connection failure. In consequence, the connection is not very reliable, the yield is poor, and the manufacturing cost is high.

BRIEF SUMMARY OF THE INVENTION

Accordingly, the object of the present invention is to provide photovoltaic modules and a power generation system, improved in quality and yield and lowered in manufacturing cost.

In order to achieve the above object, according to the present invention, there is provided a photovoltaic module with a plurality of photovoltaic cells, which comprises a busbar body connected electrically to the photovoltaic cells and an extension extending integrally from the busbar body and serving as an output fetching line. According to the invention, the busbar that is connected to the photovoltaic cells doubles as an output fetching line, so that any other output fetching lines to be prepared independently of the busbar need not be soldered to the busbar. Thus, the number of soldering spots in an output fetching wiring unit can be reduced.

More specifically, the photovoltaic module according to the invention comprises a transparent substrate, the photovoltaic cells arranged on the back surface of the transparent substrate, an electrical insulating filler covering the respective back surfaces of the photovoltaic cells, a cover film covering the filler, and the busbar including the busbar body connected electrically to the photovoltaic cells and embedded in the filler and the extension long enough to project from one end of the transparent substrate, the extension being drawn out through the cover film. The filler functions as an adhesive for bonding the back surfaces of the photovoltaic cells and the cover film.

According to the invention, the busbar itself doubles as an output fetching line, so that it is unnecessary to prepare any other output fetching lines independent of the busbar or to solder the output fetching lines. Thus, the necessary number of soldering spots for the output fetching wiring unit can be reduced. Since the extension of the busbar, which serves as the output fetching line, is turned up on the back surface of the photovoltaic module, it can be confined within the outer peripheral contour of the transparent substrate. Besides, these busbar extensions can be easily connected to terminals that are arranged on the back surface of the module.

A spacer of an electrical insulating material may be used according to the invention. The spacer is put on an end portion of the busbar body. The busbar extension is bent along the spacer and drawn out of the cover film through a through hole in the cover film. An electrical insulating sheet, such as a nonwoven fabric of fiberglass or an insulating resin (e.g. polyvinyl fluoride), may be used for the spacer. In order to improve the electrical insulating properties further, an electrical insulating synthetic resin, such as polyvinyl fluoride, may be used for the cover film. Since longitudinally intermediate portions of the busbar extension are buried in the filler according to the invention, a long sealing distance can be secured for the output fetching line (busbar extension), so that the water resistance is improved. In the case of the electrical insulating spacer is interposed between the busbar extension and the photovoltaic cells, moreover, an electrical short circuit between the output fetching line and the cells can be prevented securely.

According to the invention, the busbar extension may be formed having a bent portion turned down to change the course in the middle in its longitudinal direction so that the wiring direction of the output fetching line can be changed at the bent portion. With this arrangement, it is unnecessary to prepare any electrically conductive member in the region where the direction of the output fetching line changes or to solder the conductive member.

A power generation system according to the invention comprises the photovoltaic module as a generating element in a roofing material or the like. The generating element may be incorporated in a tile body that constitutes a roofing tile.

According to the photovoltaic module and the power generation system of the invention, the number of soldering spots in the output fetching wiring unit is reduced, so that the incidence of failure attributable to soldering is lowered. Thus, the quality and yield of the photovoltaic module, as well as the workability of the wiring unit, are improved, so that the manufacturing cost can be lowered.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2A is a sectional view of a part of the photovoltaic module taken along line Z—Z of FIG. 1;

FIG. 2B is a sectional view of a part of the photovoltaic module taken along line Z'—Z' of FIG. 1;

DETAILED DESCRIPTION OF THE INVENTION

A first embodiment of the present invention will now be described with reference to the accompanying drawings of FIGS. 1 to 10, 21 and 22.

Figure 21:
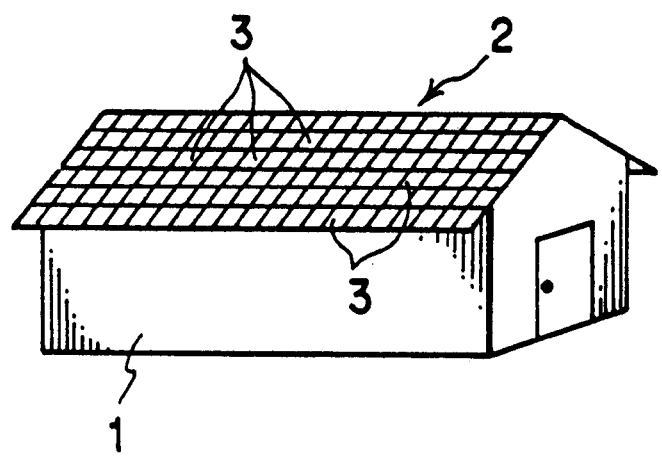
FIG. 21 is a perspective view schematically showing an external appearance of a building furnished with a power generation system.
Figure 22:
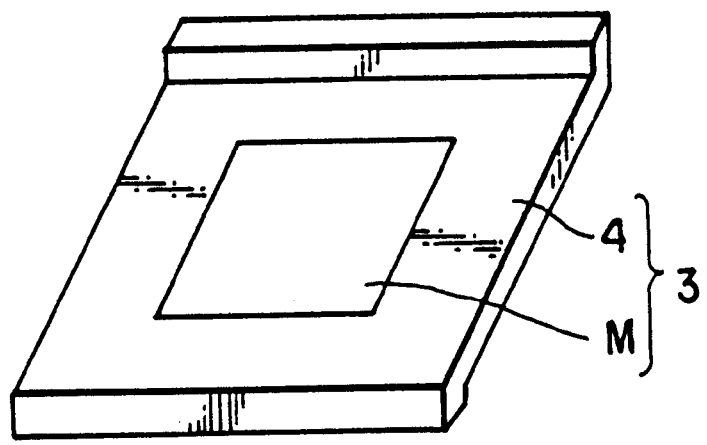
FIG. 22 is a perspective view of a roofing material for the building shown in FIG. 21.
Figure 23A:
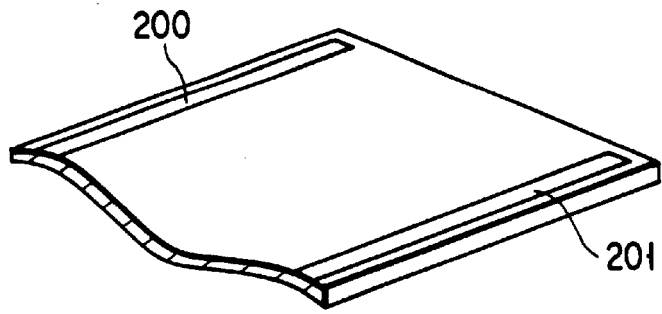
FIGS. 23A, 23B, and 23C are perspective views individually showing processes for obtaining an output fetching wiring unit of a conventional photovoltaic module.
Figure 23B:
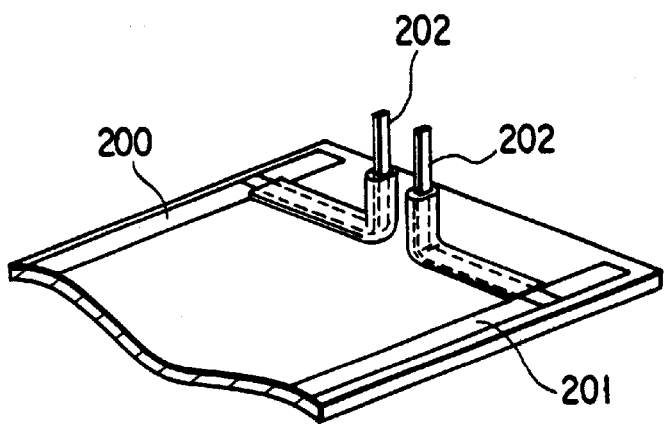
Figure 23C:
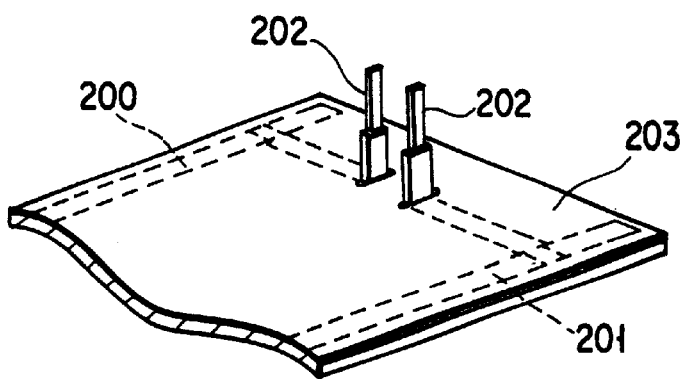

FIG. 21 shows a building 1, e.g., a house, which is furnished with a power generation system. A roof 2 of the building 1 carries thereon the power generation system, which comprises a large number of photovoltaic roofing tiles 3 that serve as generating elements. As shown in FIG. 22, each roofing tile 3 includes a photovoltaic module M that is incorporated in a tile body 4. The module M need not always be incorporated in the tile body 4. For example, the module M may be fitted with a frame or some other attachment so that it can be used directly as a roofing material. Alternatively, the module M may be set on a roof with the aid of a rack.

Figure 1:
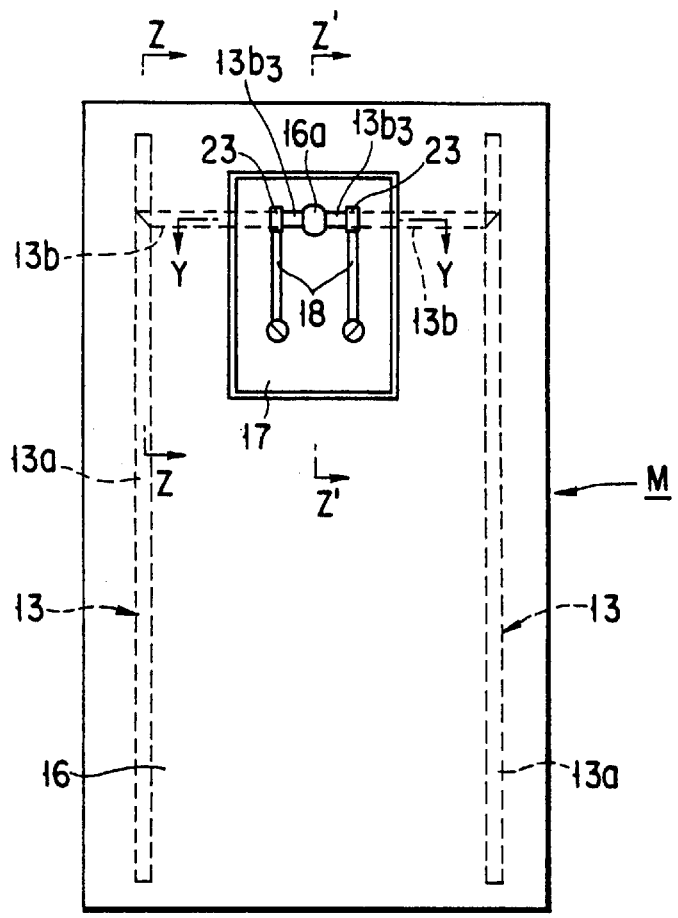
FIG. 1 is a rear plan view of a photovoltaic module according to a first embodiment of the present invention.
Figure 3:
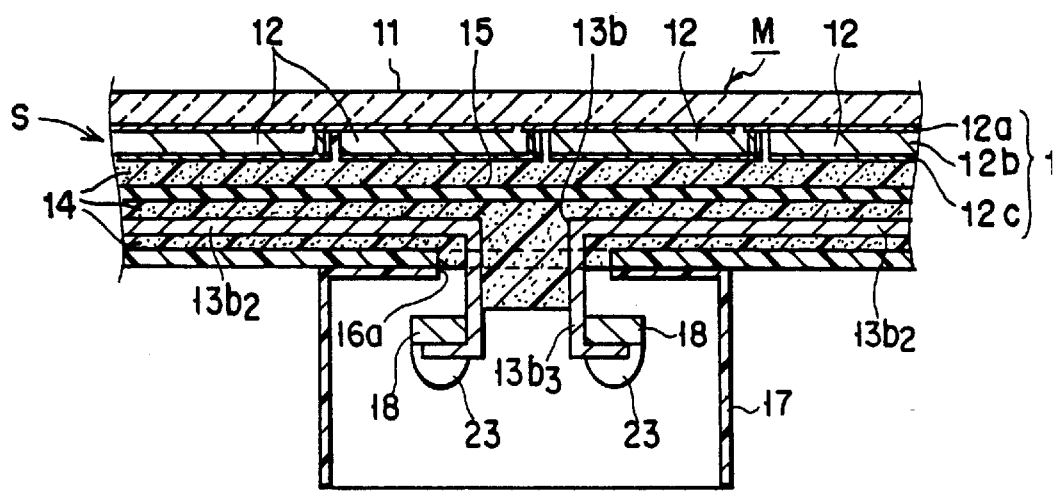
FIG. 3 is a sectional view of a part of the photovoltaic module taken along line Y—Y of FIG. 1.

FIG. 1 is a rear view of the photovoltaic module M. As shown in FIGS. 2A, 2B and 3, the photovoltaic module M is provided with an optically transparent substrate 11, a plurality of photovoltaic cells 12 arranged on the back surface of the substrate 11, a pair of busbars 13 for positive and negative electrodes, an electrical insulating filler 14, electrical insulating spacer 15, cover film 16, and terminal box 17, etc.

The transparent substrate 11 is formed of, e.g., a glass plate as an electrical insulating material. A plurality of photovoltaic cells 12 are arranged all over the back surface of the substrate 11 except the region around the substrate 11. According to the present embodiment, the photovoltaic cells 12 are amorphous cells. As shown in FIGS. 2A and 2B, each photovoltaic cell 12 is composed of an optically transparent electrode layer 12a formed on the back surface of the substrate 11, a semiconductor layer 12b formed of amorphous silicon or the like, a back electrode layer 12c, etc. The filler 14 functions as an adhesive for bonding the electrode layer 12c of the photovoltaic cells 12 and the cover film 16. As shown in FIG. 3, the cells 12, which constitute a unit cell S, are formed so as to be arranged in a row by patterning using a laser or the like. The respective semiconductor layers 12b of the photovoltaic cells 12 integrated in this manner are connected electrically in series with one another through their corresponding transparent electrode layers 12a and back electrode layers 12c. Each back electrode layer 12c is formed of a metallic foil or electrically conductive paste.

Each of the paired busbars 13, which serve as electrodes for fetching the output of the photovoltaic module M, includes a busbar body 13a and an extension 13b that functions as an output fetching line. The respective busbar bodies 13a of the paired busbars 13 are connected electrically to the respective electrode layers 12a or 12c of the paired photovoltaic cells 12 that are situated individually at the opposite side portions of the unit cell S. As shown in FIG. 1, the respective extensions 13b of the busbars 13 for positive and negative electrodes are connected individually to terminals 18 of the terminal box 17 by means of solder 23. The terminal box 17 is located in the central portion of the back surface of the photovoltaic module M, for example.

The filler 14 covers the respective back surfaces of the photovoltaic cells 12 and the busbar bodies 13a. Although EVA (ethylene-vinyl acetate copolymer) is used for the filler 14 according to the present embodiment, an electrical insulating material, such as PVB (polyvinyl butyral), silicone resin, etc., may be used instead.

The spacer 15 is interposed between the photovoltaic cells 12 and the busbar extensions 13b. The spacer 15 may be formed of an electrical insulating material, preferably an electrical insulating material (e.g., nonwoven fabric of fiberglass) that can be impregnated with the heated fused filler 14. In order to enhance the insulating performance of the spacer 15, the spacer 15 may be formed of the same material as the cover film 16.

The cover film 16, which serves as an electrical insulating protective layer, is put on the back surface of the filler 14. The cover film 16 is formed of an insulating film, such as a fluorine-based film such as polyvinyl fluoride, or PET film, which has high moisture vapor resistance and high water resistance. The cover film 16 may be formed of an aluminum foil that is sandwiched between insulating films of this type. Alternatively, a sheet glass may be used in place of the cover film 16.

Figure 4:
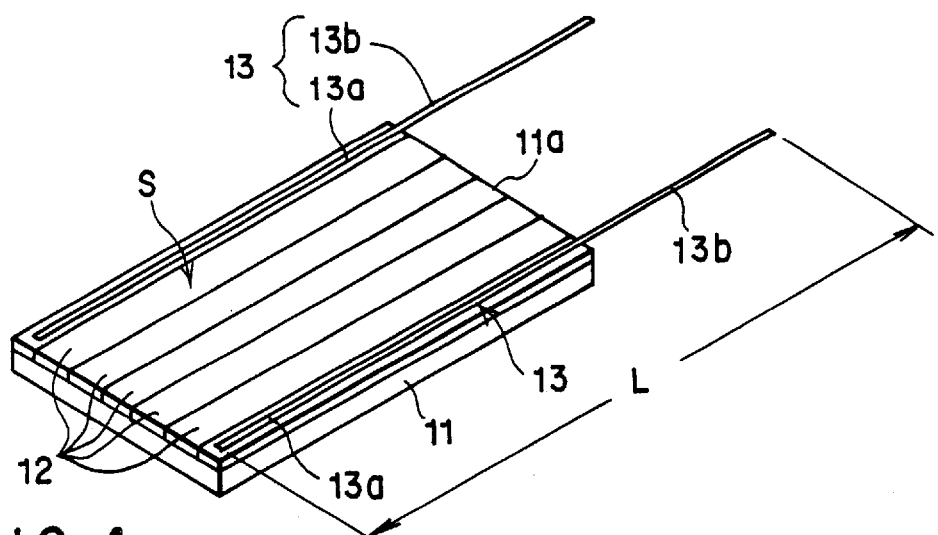
FIG. 4 is a perspective view of a combination of photovoltaic cells, busbars, etc., showing a first process for obtaining an output fetching wiring unit according to the first embodiment.

Referring now to FIGS. 4 to 10, there will be described manufacturing processes for the photovoltaic module M. In a first process, as shown in FIG. 4, the paired busbars 13 are fixed to the photovoltaic cells 12 on the transparent substrate 11 by soldering. Each busbar 13 is formed of an electrically conductive material, such as a flat-type copper wire having a flat rectangular cross section, that is, a metallic bar material that can be bent and maintain a bent state. Each busbar 13 has a length L greater than that of the substrate 11. The respective extensions 13b of the busbars 13 project outward from one end 11a of the substrate 11. Each busbar 13 includes the busbar body 13a, which is confined within the outer peripheral contour of the substrate 11, and the extension 13b, which extends integrally from the busbar body 13a and projects outward from the one end 11a of the substrate 11.

Figure 5:
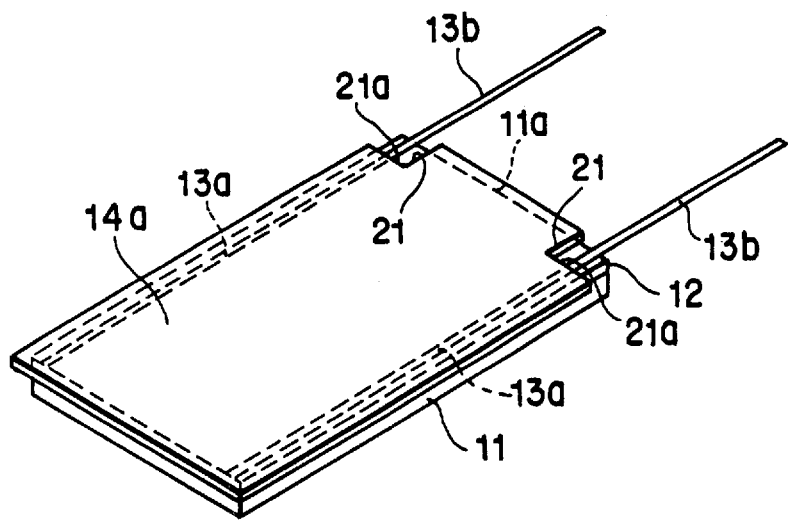
FIG. 5 is a perspective view of a combination of a filler sheet, busbars, etc., showing a second process for obtaining the wiring unit according to the first embodiment.

In a second process, as shown in FIG. 5, a first sheet 14a for the filler 14 is put on the cells 12. The sheet 14a, which is formed of EVA (ethylene-vinyl acetate copolymer), for example, is a size larger than the transparent substrate 11 and has notches 21 at two opposite corner portions near the one end 11a of the substrate 11. The first sheet 14a covers the busbar bodies 13a, and the busbar extensions 13b project outward from the substrate 11 through the notches 21, individually. The notches 21 serve to prevent the extensions 13b from projecting outside the outer peripheral contour of the substrate 11 even though the extensions 13b are turned up toward the first sheet 14a. Those portions of the busbar bodies 13a which face the notches 21 are not soldered to the cells 12.

Figure 6:
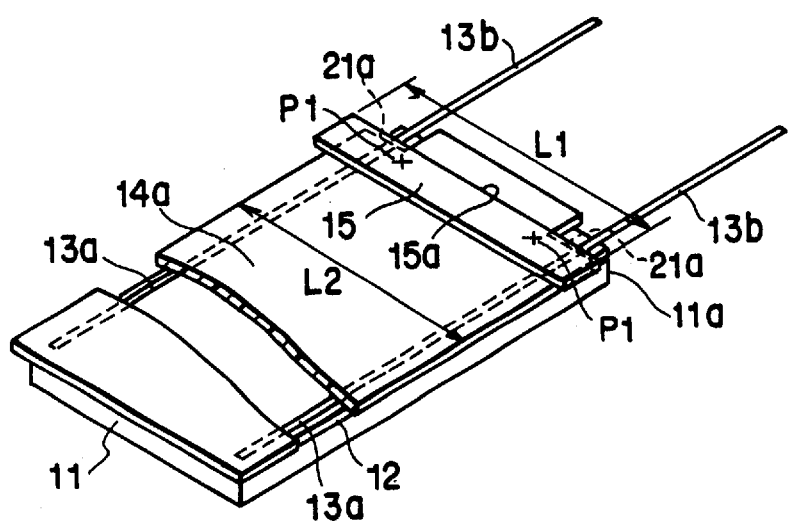
FIG. 6 is a perspective view of a combination of a spacer, busbar extensions, etc., showing a third process for obtaining the wiring unit according to the first embodiment.

In a third process, as shown in FIG. 6, the single spacer 15 of nonwoven fiber glass fabric or polyvinyl fluoride film is put on a part of the transparent substrate 11 near the one end 11a thereof so as to extend in the width direction of the first sheet 14a. A length L1 of the spacer 15 is a little greater than a width L2 of the first sheet 14a. Alternatively, the length L1 may be shorter than L2. The spacer 15 is put on the first sheet 14a in a manner such that its one side edge 15a extends along an edge 21a of each notch 21. The spacer 15 is possibly tacked by means of an adhesive agent or the like that is supplied to tacking spots P1. Alternatively, the spacer 15 may be tacked at the tacking spots P1 by thermally fusing some parts of the sheet 14a by means of a spot iron or the like.

Figure 7A:
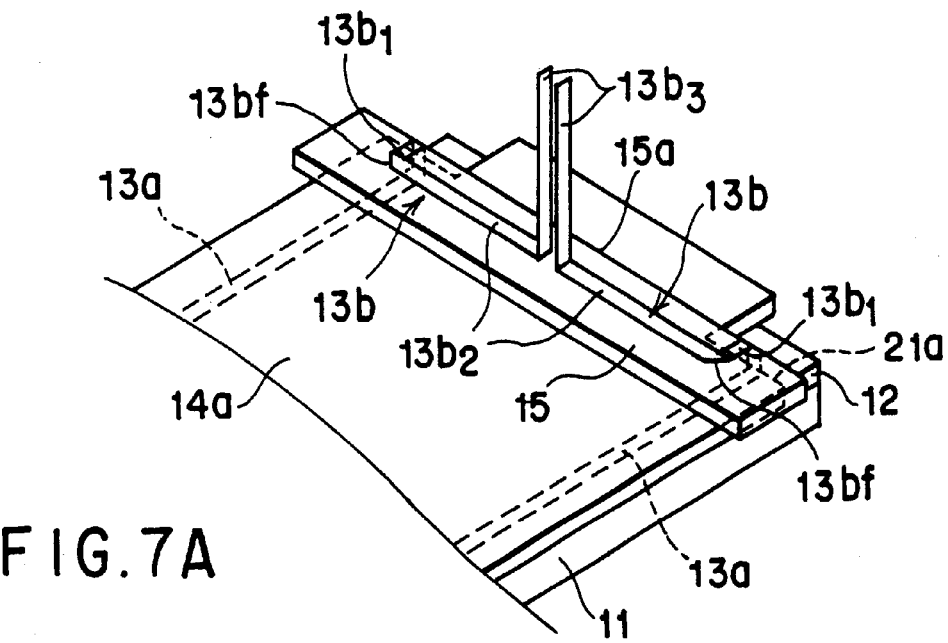
FIG. 7A is a perspective view of the combination of the spacer, busbar extensions, etc., showing a fourth process for obtaining the wiring unit according to the first embodiment.
Figure 7B:
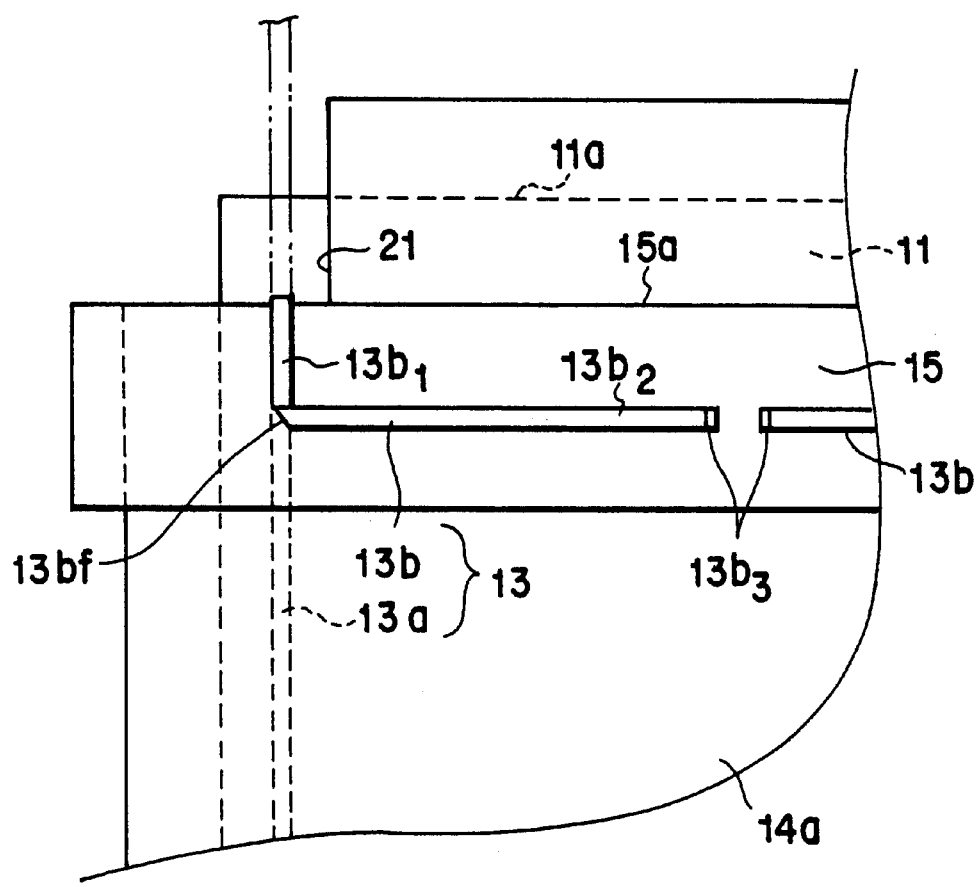
FIG. 7B is a plan view of a part of the combination of the spacer, busbar extensions, etc. shown in FIG. 7A.

In a fourth process, as shown in FIG. 7A, the busbar extensions 13b are bent so as to be confined within the outer peripheral contour of the transparent substrate 11. More specifically, each extension 13b is first bent at an end of its corresponding busbar body 13a in the thickness direction of the spacer 15 so as to extend along the one side edge 15a of the spacer 15 and the edge 21a of the corresponding notch 21, and is further bent so as to lie on the back surface of the spacer 15, whereupon a first laminated portion $13b_1$ is formed. Then, at each bent portion 13bf, each extension 13b is bent at 90° to extend in the longitudinal direction of the spacer 15, whereupon a second laminated portion $13b_2$ is formed. Thus, the bent portion 13bf on the boundary between the first and second laminated portions $13b_1$ and $13b_2$ is turned inside out as the extension 13b is bent at 90° on the spacer 15. Further, an output end portion $13b_3$ is bent so as to rise from the second laminated portion $13b_2$. The respective output end portions $13b_3$ of the paired busbar extensions 13b project substantially parallel to each other on the back surface of the photovoltaic module M.

Figure 8A:
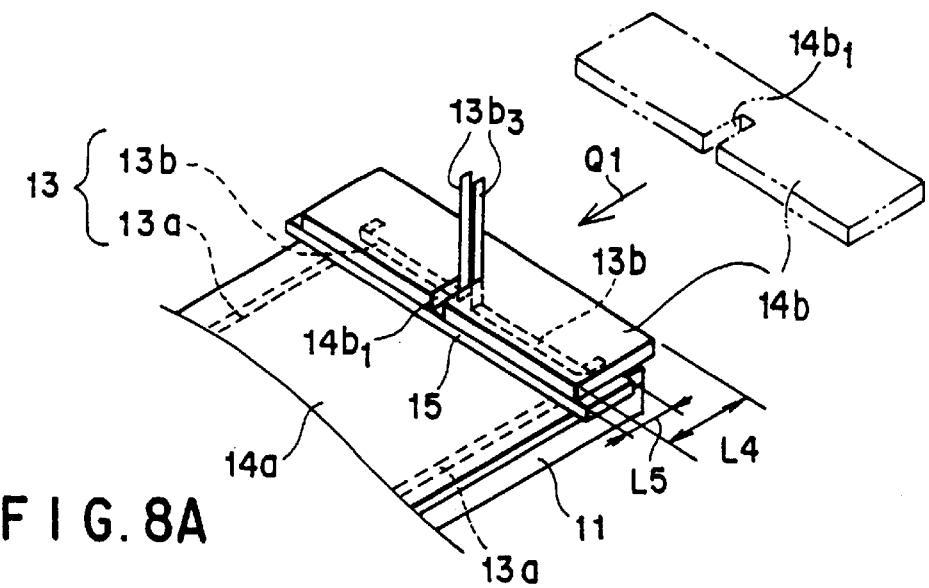
FIG. 8A is a perspective view of the combination of the spacer, busbar extensions, etc., showing a fifth process for obtaining the wiring unit according to the first embodiment.

In a fifth process, as shown in FIG. 8A, a second sheet 14b for the filler 14 of EVA is put on the spacer 15. Since a width L4 of the second sheet 14b is greater than a width L5 of the spacer 15, the notches 21 are covered by the second sheet 14b. A groove $14b_1$ is formed in the central portion of one side edge of the second sheet 14b. The respective output end portions $13b_3$ of the busbar extensions 13b are passed through the groove $14b_1$. The second sheet 14b is put on the spacer 15 in the direction indicated by arrow Q1 in FIG. 8A. The groove $14b_1$ may be replaced with a through hole $14b_2$ (FIG. 8B) in the sheet 14b into which the busbar extensions 13b are to be inserted. In some cases, the sheet 14b may be tacked to the spacer 15 with an adhesive or by fusing some parts of the sheet by means of a spot iron or the like.

Figure 9:
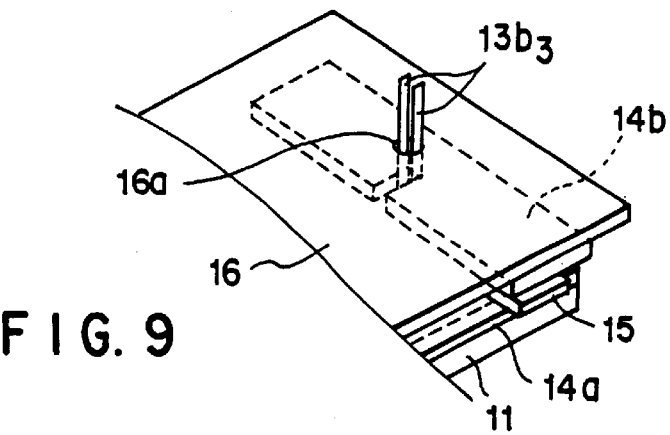
FIG. 9 is a perspective view of a combination of a cover film, busbar extensions, etc., showing a sixth process for obtaining the wiring unit according to the first embodiment.

In a sixth process, as shown in FIG. 9, the cover film 16 of polyvinyl fluoride is laid over the sheets 14a and 14b. The cover film 16 is a size larger than the first sheet 14a. A through hole 16a is bored through an end portion of the cover film 16. The paired output end portions $13b_3$ are passed through the hole 16a. The cover film 16 is possibly tacked by means of an adhesive agent after it is laid over the sheets 14a and 14b. The cover film 16 may be tacked to the sheets 14a and 14b by thermally fusing some parts of the sheets by means of a spot iron or the like.

Figure 10:
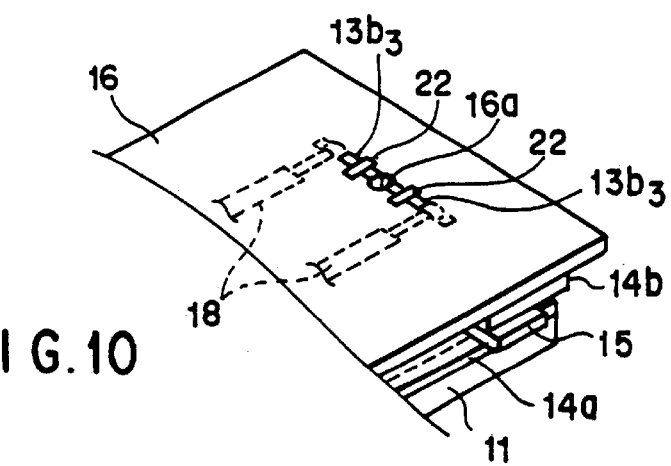
FIG. 10 is a perspective view of the combination of the cover film, busbar extensions, etc., showing a seventh process for obtaining the wiring unit according to the first embodiment.

In a seventh process, as shown in FIG. 10, the paired output end portions $13b_3$ that project outward from the through hole 16a are bent in opposite directions along the cover film 16. The output end portions $13b_3$ bent in this manner are fixed temporarily to the cover film 16 by means of adhesive tapes 22.

As these processes are carried out in this manner, the respective output end portions $13b_3$ of the busbar extensions 13b that double as output fetching lines are drawn out on the back surface of the cover film 16 through the through hole 16a. The electrical insulating spacer 15 is interposed between the busbar extensions 13b and the photovoltaic cells 12. The second sheet 14b and the cover film 16 are stacked in layers on the extensions 13b.

An assembly (semi-finished product for the photovoltaic module) that is composed of these laminated members is heated in a hot-melt treatment process. In this process, the first and second sheets 14a and 14b are melted, and the space between the transparent substrate 11 and the cover film 16 is filled up with the filler 14. Thus, the respective back surfaces of the photovoltaic cells 12, the busbar bodies 13a, the spacer 15, and the busbar extensions 13b except the respective output end portions $13b_3$ are buried in the filler 14. After this hot-melt process, the output end portions $13b_3$ are connected individually to the terminals 18 of the terminal box 17 by means of the solder 23. The terminal box 17 is fixed to the back surface of the photovoltaic module with an adhesive or the like. Power cables (not shown) are connected individually to the terminals 18 of the terminal box 17 by using fixing means, such as screws, soldering, caulking, etc.

In an output fetching wiring unit of the photo-voltaic module M according to the present embodiment, the busbar extensions 13b double as output fetching lines, so that output fetching lines independent of the busbars 13 need not be soldered to the busbars 13, and therefore, the number of soldering spots of the wiring unit can be reduced. Accordingly, the workability of the output fetching wiring unit is improved, so that the manufacture of the photovoltaic module M is facilitated. Since the soldering spots are reduced in number, moreover, the incidence of conduction failure at the soldering spots is lowered. Thus, the quality of the output fetching wiring unit and hence that of the photovoltaic module M are improved. Since the yield of the photovoltaic module M is improved, so that the manufacturing cost can be lowered.

Since the busbar extensions 13b are drawn out onto the back surface of the photovoltaic module M through the through hole 16a of the cover film 16, the respective output end portions $13b_3$ of the extensions 13b can be easily connected to the terminal box 17 on the back surface of the module. Moreover, the respective output end portions $13b_3$ of the busbar extensions 13b can be connected directly to the terminals of the terminal box 17. Accordingly, there is no necessity for using lead wires, and the number of soldering spots can be further reduced.

Further, some of the electrical insulating filler 14 cures after the electrical insulating spacer 15 between the busbar extensions 13b and the photo-voltaic cells 12 is impregnated with it in the hot-melt process, so that the spacer 15 can securely insulate the extensions 13b from the photovoltaic cells 12. Since the nonwoven fabric of fiberglass for the spacer 15 can be easily impregnated with the filler 14 that is melted in the hot-melt process, the spacer 15 can be fully stuffed with the filler 14.

Since the first and second laminated portions $13b_1$ and $13b_2$ in longitudinally intermediate portions of each busbar extension 13b are buried in the filler 14, a long sealing distance can be secured between the through hole 16a of the cover film 16 and each busbar body 13a. Accordingly, external penetration of water can be prevented securely. Thus, corrosion of the busbars 13 or the back electrode layers 12c attributable to penetration of water can be avoided, so that the durability of the system is improved. According to the conventional method in which the output fetching lines are soldered to the busbars, it is laborious to insulate the output fetching lines securely from the back electrode layers of the photo-voltaic cells. According to the present invention, however, the insulation between the output fetching lines and the back electrode layers of the photovoltaic cells is easy. The present invention is particularly useful to the automation of a process for forming the output fetching wiring unit of the photovoltaic module and a process for covering the back surface of the module.

FIGS. 11 to 17 show processes for obtaining an output fetching wiring unit of a photovoltaic module according to a second embodiment of the invention. In the description of the second embodiment to follow, like reference numerals are used to designate those portions which are common to the first and second embodiments, and a description of the constructions and functions of those portions will be omitted. Thus, the following is a description of differences from the first embodiment.

Figure 11:
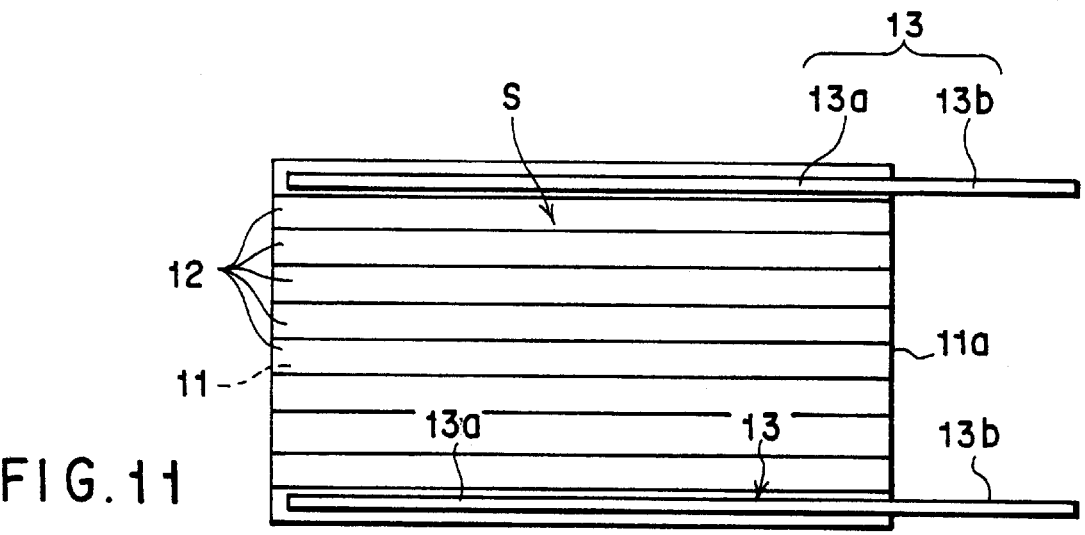
FIG. 11 is a plan view of a combination of photovoltaic cells and busbars, showing a first process for obtaining an output fetching wiring unit of a photovoltaic module according to a second embodiment of the invention.
Figure 12:
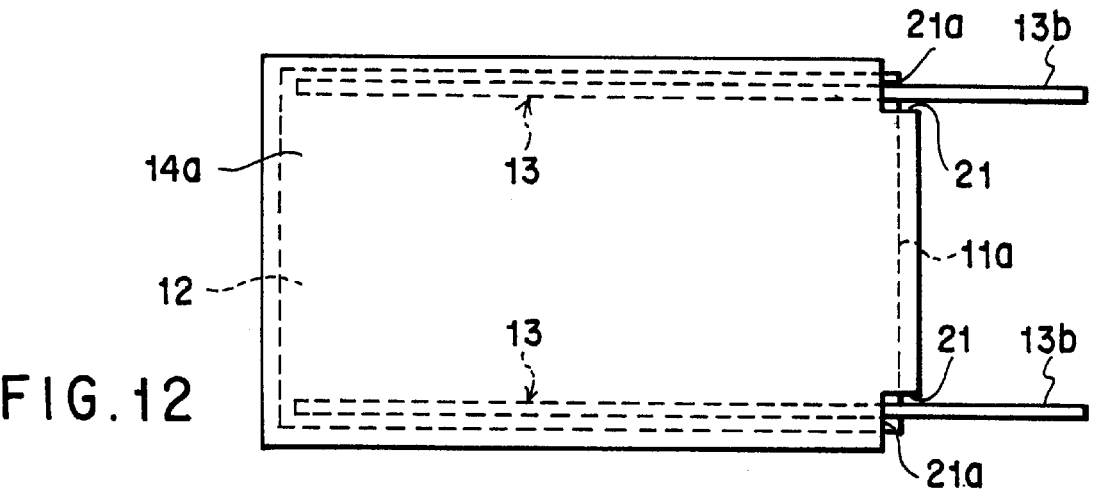
FIG. 12 is a plan view of a combination of a filler sheet and busbar extensions, showing a second process for obtaining the wiring unit according to the second embodiment.

In a first process, as shown in FIG. 11, a pair of busbars 13 are fixed to photovoltaic cells 12 by soldering. An extension 13b of each busbar 13 according to this embodiment is shorter than the busbar extension according to the first embodiment. In a second process, as shown in FIG. 12, a first filler sheet 14a is put on the respective back surfaces of the cells 12 in the same manner as in the first embodiment.

Figure 13:
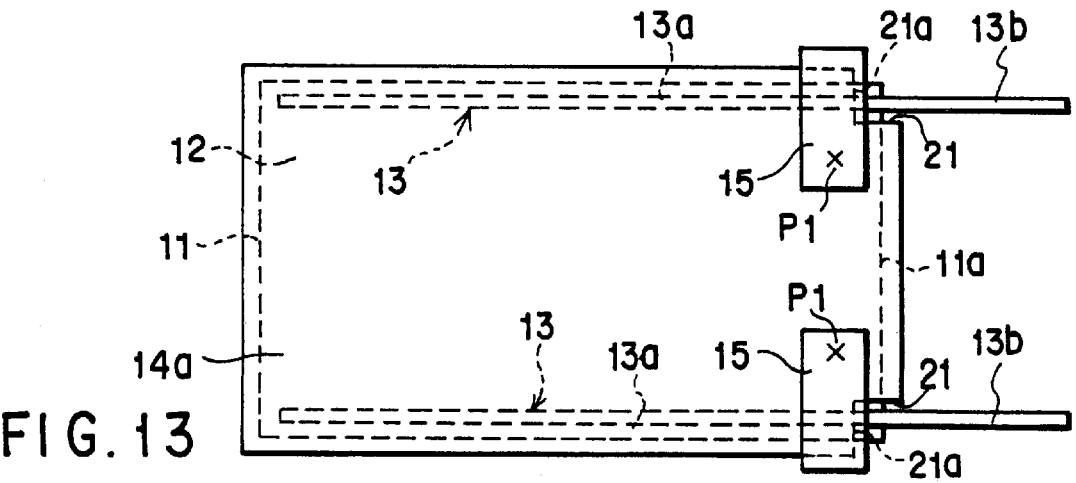
FIG. 13 is a plan view of a combination of spacers, busbar extensions, etc., showing a third process for obtaining the wiring unit according to the second embodiment.
Figure 14A:
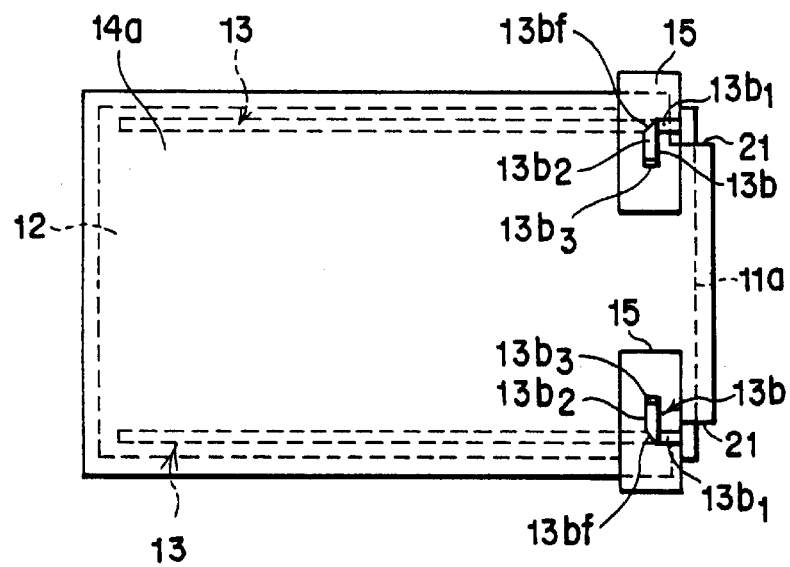
FIG. 14A is a plan view of the combination of the spacers, busbar extensions, etc., showing a fourth process for obtaining the wiring unit according to the second embodiment.
Figure 14B:
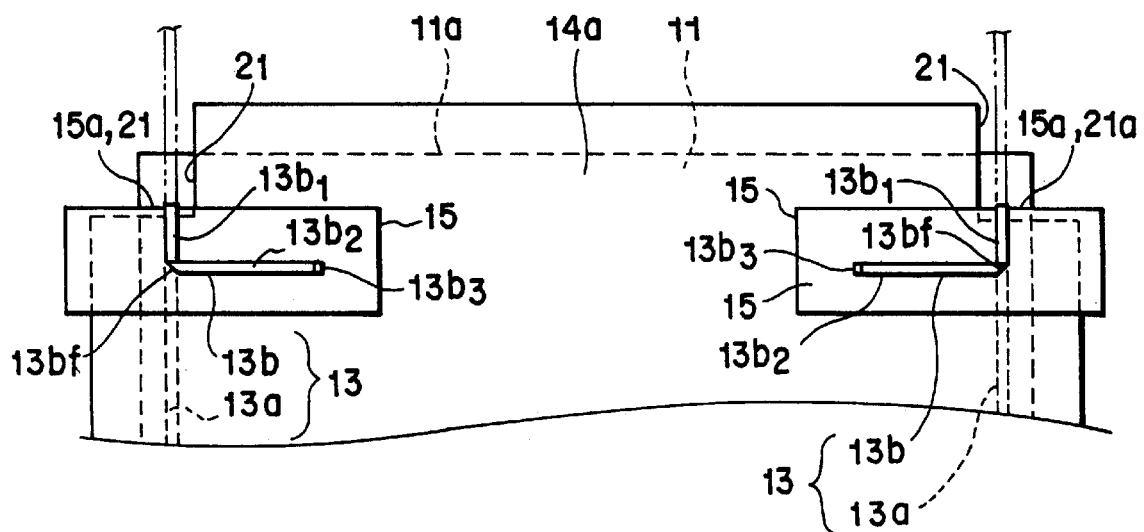
FIG. 14B is an enlarged plan view of the combination of the spacers, busbar extensions, etc. shown in FIG. 14A.

In a third process, as shown in FIG. 13, two short spacers 15 are put on the first sheet 14a. These spacers 15 are spaced in the width direction of a transparent substrate 11. In a fourth process, as shown in FIGS. 14A and 14B, the busbar extensions 13b are bent in the same manner as in the first embodiment. As this is done, first and second laminated portions $13b_1$ and $13b_2$, bent portion 13bf, etc. are formed on each spacer 15. A pair of output end portions $13b_3$ project on the back surface of the photovoltaic module.

Figure 8B:
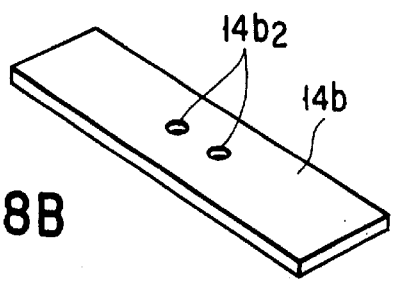
FIG. 8B is a perspective view showing a modification of the filler sheet shown in FIG. 8A.
Figure 15:
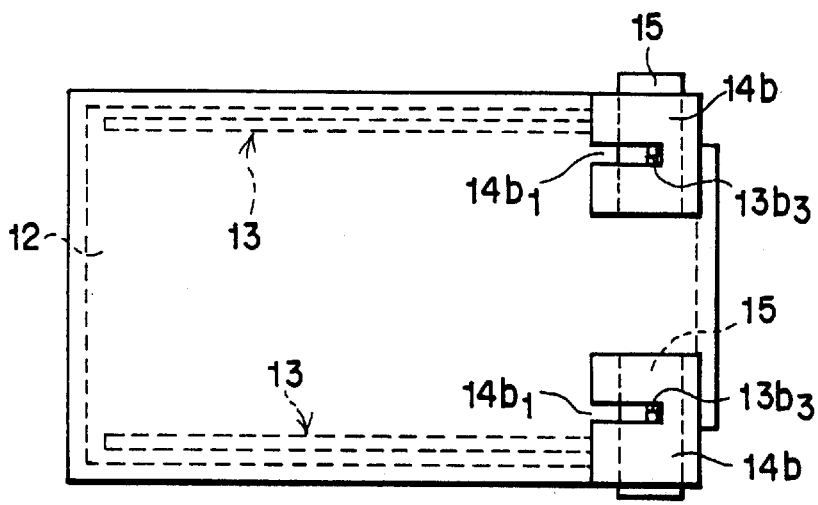
FIG. 15 is a plan view of the combination of the spacers, busbar extensions, etc., showing a fifth process for obtaining the wiring unit according to the second embodiment.

In a fifth process, as shown in FIG. 15, two short second sheets 14b are put on the spacers 15, individually. These second sheets 14b cover their corresponding notches 21 (shown in FIG. 14B). A groove $14b_1$ is formed in each second sheet 14b. Alternatively, as shown in FIG. 8B, through holes $14b_2$ may be formed in the sheet 14b. The respective output end portions $13b_3$ of the busbar extensions 13b, which double as output fetching lines, are passed through the grooves $14b_1$, individually.

Figure 16:
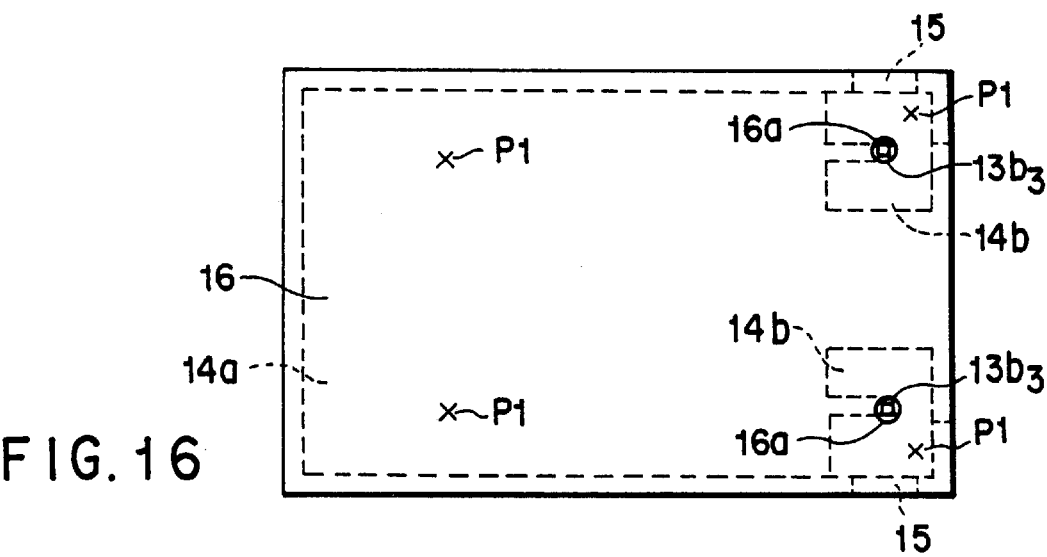
FIG. 16 is a plan view of a combination of a cover film, busbar extensions, etc., showing a sixth process for obtaining the wiring unit according to the second embodiment.
Figure 17:
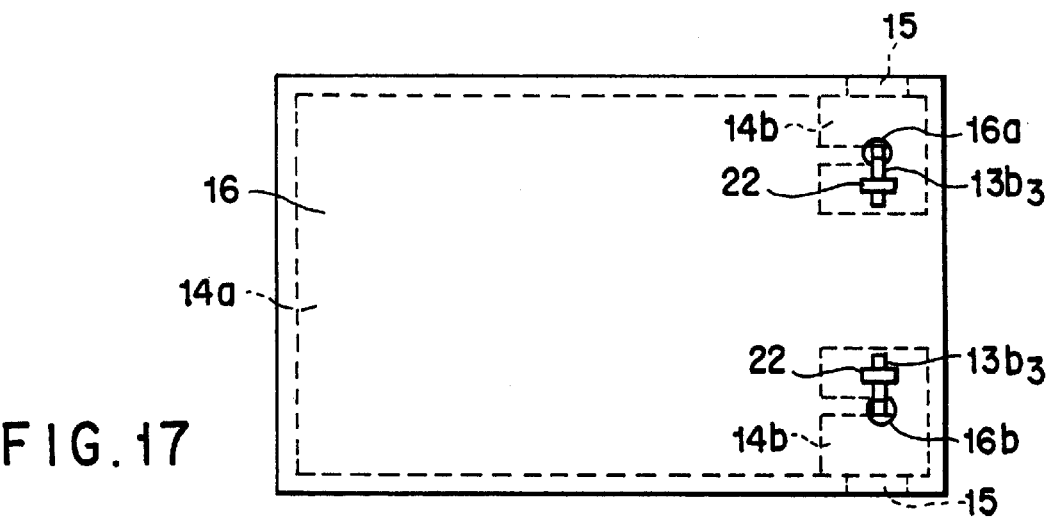
FIG. 17 is a plan view of the combination of the cover film, busbar extensions, etc., showing a seventh process for obtaining the wiring unit according to the second embodiment.

In a sixth process, as shown in FIG. 16, a cover film 16 is laid over the sheets 14a and 14b. Two through holes 16a are bored through the cover film 16. The output end portions 13$b_3$ are passed through the holes 16$a$, individually. In a seventh process, as shown in FIG. 17, the output end portions 13$b_3$ are bent along the cover film 16 and fixed temporarily to the cover film 16 by means of adhesive tapes 22. According to the second embodiment described above, the paired output end portions 13$b_3$ are spaced from each other. It is to be desired, therefore, that terminal boxes for positive and negative electrodes should be provided separately. Further, only terminals may be provided on the back surface of the photovoltaic module without using any terminal box.

The photovoltaic module according to the second embodiment can also achieve the object of the present invention for the same reason as the first embodiment. According to the second embodiment, moreover, the extensions 13$b$ that double as output fetching lines can be made shorter than those of the first embodiment. Thus, the respective areas of the spacers 15 and the second sheets 14$b$ can be made smaller than in the case of the first embodiment, so that the material cost and hence the manufacturing cost can be reduced. Besides, a long insulation distance can be secured between the respective output end portions 13$b_3$ of the paired busbar extensions 13$b$ that serve as output fetching lines.

Figure 18A:
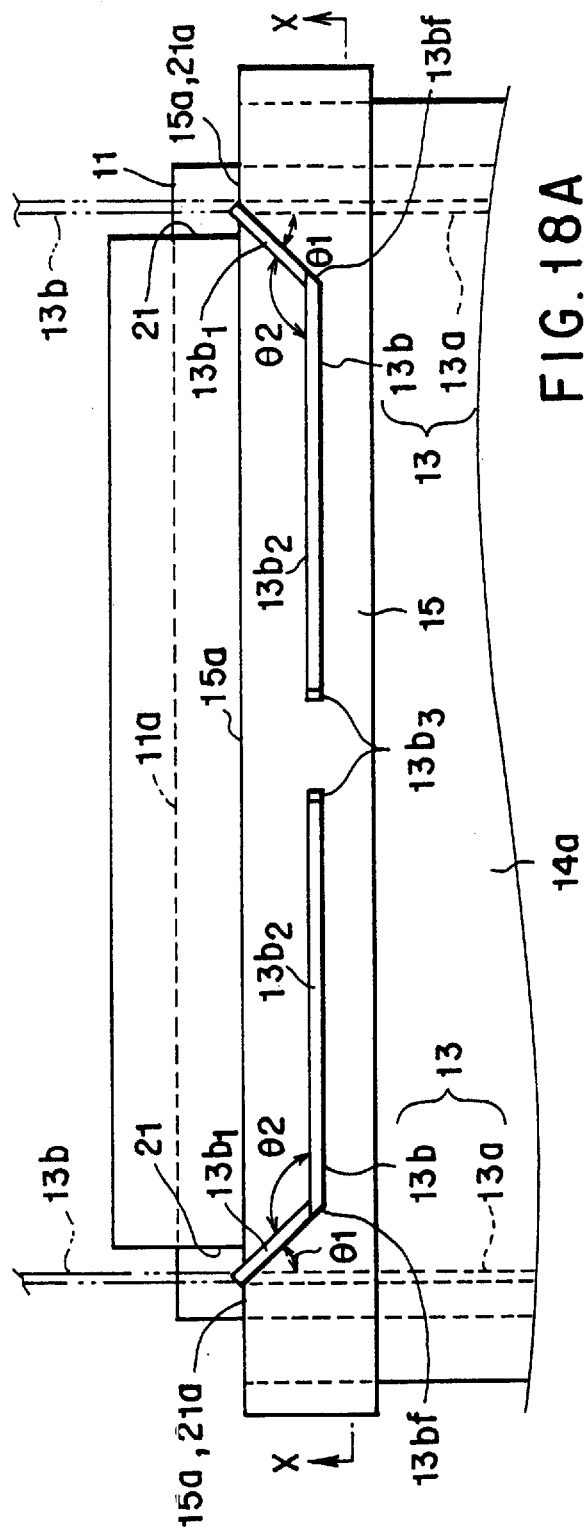
FIG. 18A is a plan view of a combination of a spacer, busbar extensions, etc., showing a fourth process for obtaining an output fetching wiring unit of a photovoltaic module according to a third embodiment of the invention.
Figure 18B:
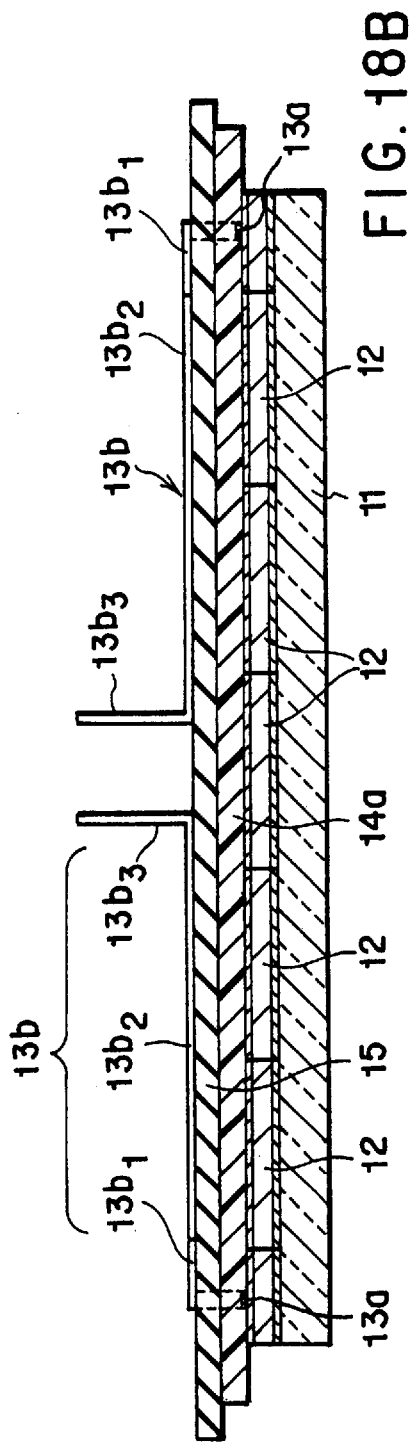
FIG. 18B is a sectional view of the photovoltaic module taken along line X—X of FIG. 18A.

FIGS. 18A and 18B show one (fourth process) of processes for obtaining an output fetching wiring unit of a photovoltaic module according to a third embodiment of the invention. Basically, this embodiment is arranged in the same manner as the first embodiment. In the description to follow, therefore, like reference numerals are used to designate those portions which are common to the first and third embodiments, and a description of the constructions and functions of those portions will be omitted. Thus, the following is a description of differences from the first embodiment. First to third processes according to the third embodiment are identical with the first to third processes (FIGS. 4 to 6), respectively, according to the first embodiment.

In a fourth process according to the third embodiment, as shown in FIG. 18A, each busbar extension 13$b$ that projects from one end 11$a$ of a transparent substrate 11 is bent on a spacer 15. In this embodiment, each first laminated portion 13$b_1$ is turned up on the spacer 15 so that it is inclined at an angle θ1 of, e.g., about 45° to a busbar body 13$a$. Each second laminated portion 13$b_2$ is turned inside out at a bent portion 13$bf$ so that it is inclined at an angle θ2 of about 135° to the first laminated portion 13$b_1$. As shown in FIG. 18B, a pair of output end portions 13$b_3$ are bent so as to project substantially parallel to each other above the spacer 15. In a fifth process, moreover, a second filler sheet 14$b$ is put on the spacer 15 in the same manner as in the fifth process (FIG. 8A) according to the first embodiment. In a sixth process, a cover film 16 is laid over the spacer 15 in the same manner as in the sixth process (FIG. 9) according to the first embodiment. In a seventh process, the output end portions 13$b_3$ are bent in opposite directions along the cover film 16 and fixed temporarily to the cover film 16 by means of adhesive tapes 22 in the same manner as in the seventh process (FIG. 10) according to the first embodiment.

The photovoltaic module according to the third embodiment can also achieve the object of the present invention for the same reason as the first embodiment. According to the third embodiment, moreover, the first laminated portion 13$b_1$ of each busbar extension 13$b$ is inclined with respect to its corresponding busbar body 13$a$, so that the length of the extension 13$b$ can be shortened. Thus, the material cost for the busbars 13 can be reduced, so that the manufacturing cost can be lowered.

Figure 19A:
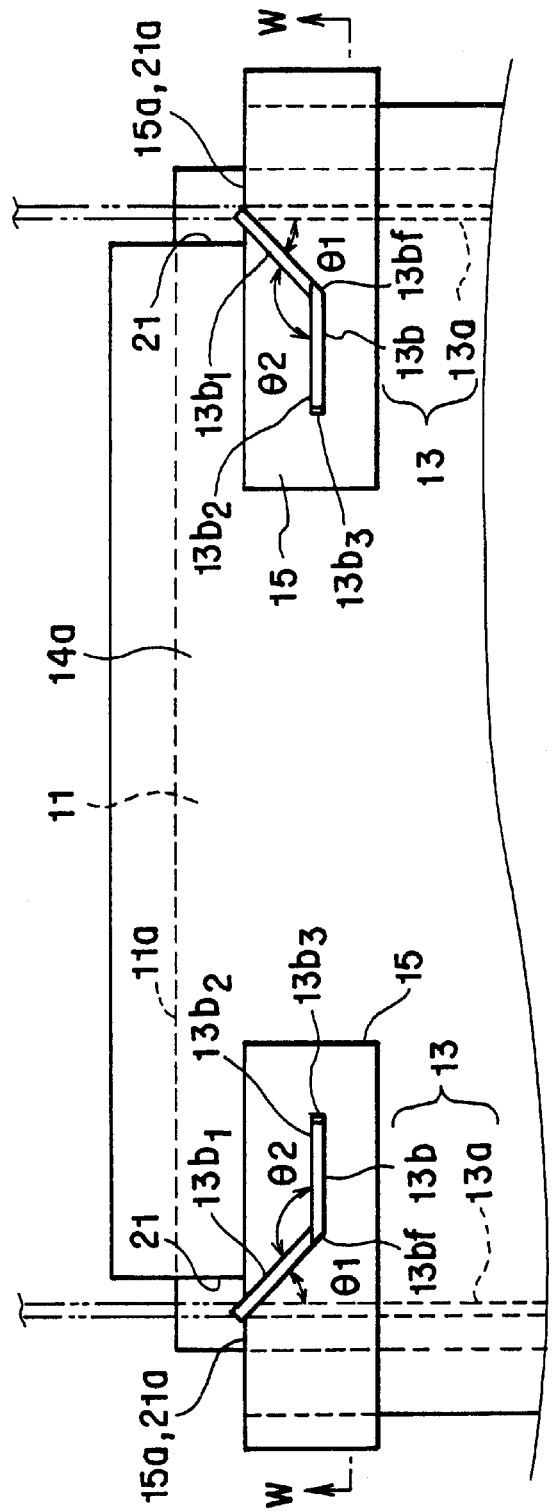
FIG. 19A is a plan view of a combination of spacers, busbar extensions, etc., showing a fourth process for obtaining an output fetching wiring unit of a photovoltaic module according to a fourth embodiment of the invention.
Figure 19B:
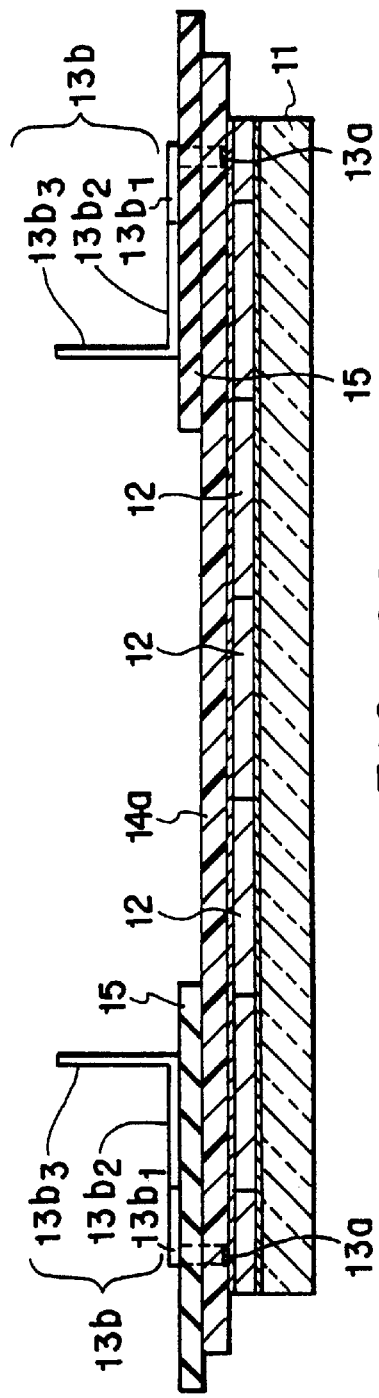
FIG. 19B is a sectional view of the photovoltaic module taken along line W—W of FIG. 19A.

FIGS. 19A and 19B show one (fourth process) of processes for obtaining an output fetching wiring unit of a photovoltaic module according to a fourth embodiment of the invention. Basically, this embodiment is arranged in the same manner as the second embodiment. In the description to follow, therefore, like reference numerals are used to designate those portions which are common to the second and fourth embodiments, and a description of the constructions and functions of those portions will be omitted. Thus, the following is a description of differences from the second embodiment. First to third processes according to the fourth embodiment are identical with the first to third processes (FIGS. 11 to 13), respectively, according to the second embodiment.

As shown in FIG. 19A, two short spacers 15 are used in a fourth process according to the fourth embodiment. Each busbar extension 13$b$ that projects from one end 11$a$ of a transparent substrate 11 is bent on each spacer 15. In this embodiment, each first laminated portion 13$b_1$ is turned up on its corresponding spacer 15 so that it is inclined at an angle θ1 of, e.g., about 45° to a busbar body 13$a$. Each second laminated portion 13$b_2$ is turned inside out at a bent portion 13$bf$ so that it is inclined at an angle θ2 of about 135° to the first laminated portion 13$b_1$. As shown in FIG. 19B, a pair of output end portions 13$b_3$ are bent so as to project substantially parallel to each other above the spacer 15. In a fifth process, moreover, a second filler sheet 14$b$ is put on the spacer 15 in the same manner as in the fifth process (FIG. 15) according to the second embodiment. In a sixth process, a cover film 16 is laid over the spacers 15 in the same manner as in the sixth process (FIG. 16) according to the second embodiment. In a seventh process, the output end portions 13$b_3$ are bent in opposite directions along the cover film 16 and fixed temporarily to the cover film 16 by means of adhesive tapes 22 in the same manner as in the seventh process (FIG. 17) according to the second embodiment.

The photovoltaic module according to the fourth embodiment can also achieve the object of the present invention for the same reason as the second embodiment. According to the fourth embodiment, moreover, the first laminated portion 13$b_1$ of each busbar extension 13$b$ is inclined with respect to its corresponding busbar body 13$a$, so that the length of the extension 13$b$ can be further shortened. Thus, the material cost for the busbars 13 can be reduced, so that the manufacturing cost can be further lowered.

Figure 20A:
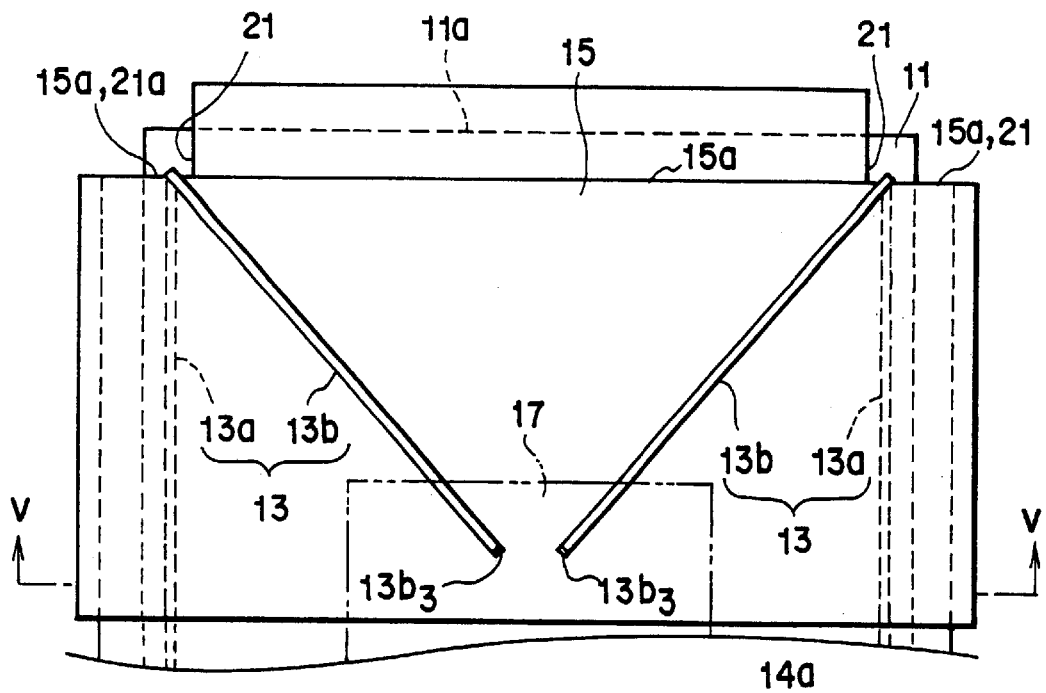
FIG. 20A is a plan view of a combination of a spacer, busbar extensions, etc., showing a fourth process for obtaining an output fetching wiring unit of a photovoltaic module according to a fifth embodiment of the invention.
Figure 20B:
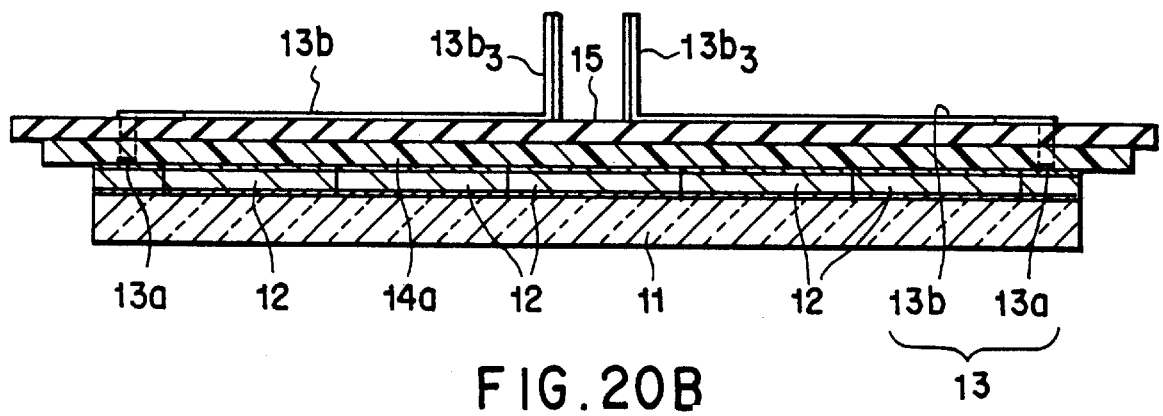
FIG. 20B is a sectional view of the photovoltaic module taken along line V—V of FIG. 20A.

FIGS. 20A and 20B show one (fourth process) of processes for obtaining an output fetching wiring unit of a photovoltaic module according to a fifth embodiment of the invention. Basically, this embodiment is arranged in the same manner as the first embodiment. In the description to follow, therefore, like reference numerals are used to designate those portions which are common to the first and fifth embodiments, and a description of the constructions and functions of those portions will be omitted. Thus, the following is a description of differences from the first embodiment. First to third processes according to the fifth embodiment are identical with the first to third processes (FIGS. 4 to 6), respectively, according to the first embodiment.

In a fourth process according to the fifth embodiment, as shown in FIG. 20A, each busbar extension 13$b$ that projects from one end 11$a$ of a transparent substrate 11 is bent so as to extend from a spacer 15 toward a terminal box 17. In this embodiment, each extension 13$b$ is turned up diagonally or at an angle to its corresponding busbar body 13$a$. An output end portion 13$b_3$ of each extension 13$b$ is long enough to reach the terminal box 17. As shown in FIG. 20B, the respective output end portions 13$b_3$ of the paired busbar extensions 13b are bent so as to project substantially parallel to each other above the spacer 15. These output end portions 13b₃ are connected to their corresponding terminals of the terminal box 17 later. In a fifth process, moreover, a second filler sheet 14b is put on the spacer 15 in the same manner as in the fifth process (FIG. 8A) according to the first embodiment. In a sixth process, a cover film 16 is laid over the spacer 15 in the same manner as in the sixth process (FIG. 9) according to the first embodiment. In a seventh process, the output end portions 13b₃ are bent in opposite directions along the cover film 16 and fixed temporarily to the cover film 16 by means of adhesive tapes 22 in the same manner as in the seventh process (FIG. 10) according to the first embodiment.

The photovoltaic module according to the fifth embodiment can also achieve the object of the present invention for the same reason as the first embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A photovoltaic module with a plurality of photovoltaic cells, comprising:
   a busbar including a busbar body connected electrically to the photovoltaic cells and an extension extending integrally from the busbar body and serving as an output fetching line, the extension including a bent portion turned down to change the course in the middle in the longitudinal direction of the extension.

2. A power generation system having a photo-voltaic module with a plurality of photovoltaic cells, the photovoltaic module comprising a transparent substrate, the photovoltaic cells arranged on the back surface of the transparent substrate, an electrical insulating filler covering the respective back surfaces of the photovoltaic cells, a cover film covering the filler, and a busbar including a busbar body connected electrically to the photovoltaic cells and embedded in the filler and an extension long enough to project from one end of the transparent substrate, the extension being drawn out through the cover film.

3. A power generation system according to claim 2, comprising generating elements each including a tile body constituting a roofing tile and the photovoltaic module incorporated in the tile body.

4. A photovoltaic module with a plurality of photovoltaic cells, each photovoltaic cell having a back surface, the photovoltaic module comprising:
   a transparent substrate having a transparent substrate back surface, the photovoltaic cells arranged on the transparent substrate back surface and made of amorphous material or the like;
   an electrical insulating filler covering the back surfaces of the photovoltaic cells;
   a cover film covering the electrical insulating filler; and
   a busbar connected to the photovoltaic cells, the busbar including:
      a busbar body electrically connected to the photovoltaic cells, extending along a longitudinal direction of the photovoltaic cells, having substantially the same length as that of the photovoltaic cells, embedded in the electrical insulating filler, and confined within an outer peripheral contour of the transparent substrate; and
      an extension integrally extending from the busbar body long enough to project from one end of the transparent substrate, the extension serving as an output fetching line as the extension is drawn out through the cover film.

5. A photovoltaic module with a plurality of photovoltaic cells, each photovoltaic cell having a back surface, the photovoltaic module comprising:
   a transparent substrate made of amorphous cells and having a transparent substrate back surface, the photovoltaic cells arranged on the transparent substrate back surface and made of amorphous material or the like;
   an electrical insulating filler covering the back surfaces of the photovoltaic cells;
   a cover film having a hole, the cover film covering the electrical insulating filler; and
   a busbar connected to the photovoltaic cells, the busbar including:
      a busbar body electrically connected to the photovoltaic cells, extending along a longitudinal direction of the photovoltaic cells, having substantially the same length as that of the photovoltaic cells, embedded in the electrical insulating filler, and confined within an outer peripheral contour of the transparent substrate; and
      an extension having laminated portions and an output end portion, the extension integrally extending from the busbar body long enough to project from one end of the transparent substrate, the extension serving as an output fetching line as the output end portion is drawn out through the hole in the cover film; and
   a spacer interposed between the photovoltaic cells and the extension, the laminated portions of the extension are bent along the spacer.

6. A method of manufacturing a photovoltaic module with a plurality of photovoltaic cells formed on a transparent substrate comprising the steps of:
   soldering a pair of busbars to the photovoltaic cells, each busbar having an extension and an output end portion;
   putting a first sheet on the photovoltaic cells and the pair of busbars;
   putting a spacer on the first sheet near one end of the transparent substrate;
   forming a first laminated portion by bending the extension of each busbar along the spacer;
   forming a second laminated portion by folding the extension of each busbar to extend in a longitudinal direction of the spacer;
   raising the output end portion of each busbar from the second laminated portion;
   putting a second sheet on the spacer;
   putting a cover film having a hole on the second sheet and inserting the output end portion of each busbar through the hole;
   bending each of the output end portions that protrude from the hole along the cover film; and
   filling between the transparent substrate and the cover film by heating and melting the first and second sheets.

* * * * *